United States Patent

Baetzold et al.

[11] Patent Number: 5,827,913
[45] Date of Patent: Oct. 27, 1998

[54] HOT MELT ADHESIVE COMPRISING AN ENCAPSULATED INGREDIENT

[75] Inventors: John P. Baetzold, North St. Paul; Thomas F. Kauffman, Woodbury; Steven L. Scholl, Cottage Grove; Eugene R. Simmons, Vadnais Heights, all of Minn.

[73] Assignee: H.B. Fuller Licensing & Financing, Inc., St. Paul, Minn.

[21] Appl. No.: 795,617

[22] Filed: Feb. 5, 1997

[51] Int. Cl.⁶ .............. C08K 9/10; B05D 5/10; B32B 27/32; B32B 27/42
[52] U.S. Cl. .............. 523/210; 523/223; 427/208.2; 428/402.21; 428/402.22
[58] Field of Search .......................... 523/210, 223; 428/402.2, 402.21, 402.22; 427/208.2

[56] References Cited

U.S. PATENT DOCUMENTS

| | | | |
|---|---|---|---|
| 2,800,458 | 7/1957 | Green | 428/402.2 |
| 3,876,603 | 4/1975 | Maklouf | 523/210 |
| 5,271,881 | 12/1993 | Redding, Jr. | 264/432 |
| 5,419,958 | 5/1995 | Charbonneau | 428/315.5 |
| 5,532,293 | 7/1996 | Landis | 523/210 |
| 5,571,617 | 11/1996 | Cooprider et al. | 428/341 |
| 5,578,184 | 11/1996 | Imataki et al. | 205/118 |
| 5,604,268 | 2/1997 | Randen et al. | 523/164 |

FOREIGN PATENT DOCUMENTS

| | | | |
|---|---|---|---|
| 0531618 A1 | 4/1992 | European Pat. Off. | |
| 4300390 | 7/1993 | Germany | 523/210 |

*Primary Examiner*—Peter A. Szekely
*Attorney, Agent, or Firm*—Nancy N. Quan; Carolyn A. Fischer

[57] ABSTRACT

The present invention is a hot melt adhesive composition comprising at least one ingredient present in an encapsulated form. The encapsulated ingredient may be any known hot melt adhesive formulation ingredient as well as any hot melt adhesive additive such as antioxidants and fragrances for which there is a desirable change in adhesive properties by isolating such ingredient for a duration of time. The encapsulated ingredient is released from the shell by means of pressure, temperature, diffusion, pH, light, radiation, ultrasound, and combinations thereof. Hot melt adhesive compositions comprising at least one encapsulated ingredient are useful for a variety of novel products including self-supported friction glue sticks, non-tacky pelletized pressure sensitive adhesives, cohesive adhesive systems, hot melt adhesive compositions exhibiting improved thermal stability and odor, as well as for a variety of other adhesive applications.

20 Claims, No Drawings

HOT MELT ADHESIVE COMPRISING AN ENCAPSULATED INGREDIENT

FIELD OF THE INVENTION

The present invention is a hot melt adhesive composition comprising at least one ingredient present in an encapsulated form. The encapsulated ingredient may be any known hot melt adhesive formulation ingredient as well as any hot melt adhesive additive such as antioxidants and fragrances for which there is a desirable change in adhesive properties by isolating such ingredient for a duration of time. The encapsulated ingredient is released from the shell by means of pressure, temperature, diffusion, pH, light, radiation, ultrasound, and combinations thereof. Hot melt adhesive compositions comprising at least one encapsulated ingredient are useful for a variety of novel products including self-supported friction glue sticks, non-tacky pelletized pressure sensitive adhesives, cohesive adhesive systems, hot melt adhesive compositions exhibiting improved thermal stability and odor, as well as for a variety of other adhesive applications.

BACKGROUND OF THE INVENTION

The use of microencapsulated ingredients in the manufacture of pharmaceuticals, pesticides, paints, and water-based adhesives is known. The most widely-known use of microcapsules has been in the product generally known as carbonless paper wherein microcapsules provide a controlled release of a color forming reagent core which is released when pressure is applied.

Landis, U.S. Pat. No. 5,532,293 discloses an adhesive system for tamper-evident envelopes. The adhesive system comprises a dried cohesive latex containing gelatin and a plurality of solvent-filled microcapsules. Applying pressure ruptures the microcapsules causing the solvent to be released, dissolving the cohesive material and forming a bond. The solvent dissolves the cohesive material without substantially dissolving the non-adherent material.

Japanese Patent Application No. 6[1994]-172725 discloses a water dispersible resin composition containing 10.0 wt % to about 90.0 wt % of encapsulated plasticizer alone or in combination with a tackiness-rendering agent having non-adhesive shells and having an average particle diameter of 10–300 μm and 10.0 wt % to about 90.0 wt % of a tackifier characterized by increased tackiness after the shells of the encapsulated plasticizer are destroyed with pressure. This patent application teaches the use of conventional water based plasticizers such as phthalic acid esters and phosphoric acid esters in combination with conventional water-based tackifiers such as acrylic-type tackifiers, natural rubber, butyl rubber, styrene-butadiene rubber and other synthetic rubber compounds.

U.S. Pat. No. 2,800,458, issued Jul. 23, 1957 teaches oil-containing microscopic capsules and the method of making, for use in aqueous dispersion transfer films.

Although water-based adhesive compositions comprising microencapsulated solvent and plasticizer have been disclosed to some extent as mentioned above, microencapsulated ingredients have never been utilized in a hot melt adhesive composition.

EP 0 531 618 A1 teaches a cohesive composition, which is tack free when cooled to room temperature and will only adhere to itself, including 60 to about 95 parts by weight of an amorphous polyalphaolefin hydrocarbon. This composition is useful as a cold seal composition for packaging, and related applications. Cohesive cold seal compositions are those which exclusively form bonds to themselves at room temperature.

Commercially available water-based glue-sticks typically are supplied in a container for the purpose of protecting the adhesive from prolonged exposure to air, which will solidify the glue-stick surface, as well as to support and contain the adhesive, as such compositions are much too pliable to maintain a stick like shape in the absence of a container.

Hot melt adhesives are used widely for a variety of applications including packaging and bookbinding wherein various wood pulp based substrates are bonded to each other. Hot melt adhesives typically comprise at least one thermoplastic polymer and at least one additional thermoplastic ingredient selected from the group consisting of tackifying resins, plasticizers, waxes, and mixtures thereof. Additionally, for hot melt pressure sensitive adhesives (PSAs) at least one ingredient is normally a liquid at ambient temperature. The liquid ingredient imparts the pressure sensitivity or surface tackiness at ambient temperature. Hot melt PSAs are most commonly applied to tapes, labels, medical devices and for various uses in disposable products such as disposable diapers and feminine napkins, for product assembly, elastic attachment, and garment attachment applications. Hot melt PSAs are often the preferred adhesive technology due to the ability to bond difficult to bond substrates such as polyolefin films and nonwoven materials at high line speeds without the additional drying step that is needed for water-based and solvent-based adhesives. The introduction of water or other solvents is particularly a problem for absorbent products as it is very difficult (if not impossible) to completely dry the absorbent. Hot melt PSAs also provide hot tack and immediate green strength, allowing for very high manufacturing rates.

SUMMARY OF THE INVENTION

The present invention is a hot melt adhesive system comprising at least one thermoplastic polymer and at least one ingredient selected from the group consisting of tackifying resins, plasticizers, waxes, and mixtures thereof, wherein at least one ingredient is present in an encapsulated form. The core ingredient is released by at least one mechanism selected from the group consisting of pressure, temperature, diffusion, pH, light, radiation, ultrasound and combinations thereof. Preferably, for hot melt PSAs, the core ingredient is normally a liquid at ambient temperature and is released by means of pressure and/or temperature.

Another aspect of the invention is a hot melt adhesive composition comprising at least one additive selected from the group consisting of antioxidants, pigments, dyes, fragrances, fire retardants, and mixtures thereof wherein said additive is present in an encapsulated form.

Another aspect of the present invention is to provide an improved hot melt cohesive adhesive system.

Another aspect of the invention is to provide an adhesive glue-stick comprising at least one thermoplastic polymer and at least one normally liquid ingredient selected from the group consisting of liquid polymers, liquid tackifying resins, liquid plasticizers, and mixtures thereof; wherein said normally liquid ingredient is present in an encapsulated form. The glue-stick produces an adhesive deposition upon application of pressure.

Another aspect of the invention is to provide a thermoplastic composition having improved thermal stability comprising at least one antioxidant encapsulated in a shell.

Another aspect of the invention is to provide a thermoplastic composition having improved odor comprising a fragrance encapsulated in a shell.

Another aspect of the invention is to provide a clean and efficient means for adding colorants such as dyes and pigment to thermoplastic compositions.

Another aspect of the invention is to provide a hot melt pressure sensitive adhesive pellet or capsule having a non-tacky surface prior to the release of the encapsulated ingredient.

Other aspects of the invention will become apparent in the forthcoming description and examples.

The present invention is a hot melt adhesive comprising at least one thermoplastic polymer and at least one ingredient selected from the group consisting of tackifying resins, plasticizers, waxes and mixtures thereof, wherein at least one ingredient is present in an encapsulated form. The encapsulated ingredient may also be a hot melt adhesive additive selected from the group consisting of antioxidants, pigments, dyes, fragrances, fire retardants, and mixtures thereof. The encapsulated ingredient is released by at least one mechanism selected from the group consisting of pressure, temperature, diffusion, pH, light, radiation, ultrasound and combinations thereof. Preferably, for hot melt PSAs, the core ingredient is normally a liquid at ambient temperature and is released by means of pressure and/or temperature.

"Hot melt adhesive" in the context of the invention means not only the commonly accepted functional meaning-thermoplastic compositions suitable to be applied molten to a material for the purpose of permanent or temporary bonding, but also those adhesives wherein the ingredients are combined molten, regardless of the end use application temperature. This departure from the more typical definition is necessary to encompass the appropriate breadth of the present invention as will be demonstrated further by the friction activated glue-sticks and improved cohesive cold seal adhesive hot melts.

Encapsulation is a term applied to the formation from suitable materials of a shell which encloses a core material. The capsules present in the hot melt adhesive system of the present invention comprise hot melt adhesive ingredient(s) and/or additive(s) as the core material and a shell material that may also be a hot melt adhesive ingredient or alternatively any other ingredient that does not detract from the hot melt adhesive properties both prior to and after rupturing of the shell. This invention relates to capsules having sizes ranging from approximately a micron to a few millimeters, which are generally referred to as microcapsules. This invention also relates to adhesives systems wherein the entire hot melt adhesive composition has been formed into capsules. For this aspect, the capsules are contemplated to be significantly larger, ranging from about 3 mm to about 10 mm. Capsules and/or microcapsules need not be uniformly spherical and may consist of irregularly-shaped objects such as those having a shell surrounding an irregular shaped crystalline core.

DETAILED DESCRIPTION OF THE INVENTION

The microencapsulated ingredient may be formed by any known microencapsulation technique such as coacervation, interfacial addition and condensation, air suspension, centrifugal extrusion, spray drying, pan coating, and by the M-CAP™ encapsulation process. The preferred microencapsulated method is the M-CAP™ process of forming a dispersion of core material and shell material and applying a pressure shock wave to the dispersion. The M-CAP™ encapsulation process is described in detail in U.S. Pat. No. 5,271,881, incorporated herein by reference.

The rate at which a core ingredient is released from the shell is a function of the material properties of the shell material, the thickness of the shell wall, the capsule size, and the composition and thickness of deposition of the hot melt adhesive composition. The microcapsules range in size from about 0.25 to 250 $\mu$m. Preferably, the size ranges from about 5 $\mu$m to about 200 $\mu$m. More preferable, the size of the microcapsules ranges from about 10 $\mu$m to about 200 $\mu$m. Furthermore, the shell wall thickness preferably ranges from about 5 to about 95 weight percent of the total microcapsule. For pressure activated and thermally activated shells, preferably the shell wall material is as thin as possible without prematurely releasing the encapsulated ingredient. For hot melt PSA capsules the shell wall thickness may be substantially higher particularly in the forthcoming embodiment wherein the adhesive composition in its entirety is processed into microcapsules.

The core ingredient may be any known hot melt adhesive formulation ingredient and/or additive for which there is a desirable change in adhesive properties by isolating such ingredient and/or additive for a duration of time. As mentioned previously, hot melt adhesive compositions typically comprise at least one thermoplastic polymer and at least one additional ingredient selected from the group consisting of tackifying resins, plasticizers, waxes, and mixtures thereof. Typical hot melt adhesive additives include antioxidants, fragrances, colorants such as pigments and dyes, fire retardants, as well as various medicinal components such as antibiotics, antiseptics, antifungal agents, etc. Such additives are often added to enhance or tailor the adhesive properties for specific end uses. Many (but not all) of the ingredients typically used for hot melt adhesives can be found in Rouyer et al., U.S. Pat. No. 5,257,491, incorporated herein by reference. The preferred core ingredient depends on the intended end use application for each particular hot melt adhesive.

A variety of shell or wall materials are suitable for microencapsulating the hot melt adhesive ingredient within the core. Table 3, p. 14 of U.S. Pat. No. 5,271,881 discloses a list of known natural and synthetic polymers and elastomers which are amenable to microencapsulation processes. The shell or wall material may be complex, having multiple walls of different compositions. Thus, it is possible to have a first capsule having its own core and shell which forms the core for a second capsule having a shell formed form the same or different material. Other polymers than those listed in U.S. Pat. No. 5,271,881, particularly block copolymers and polyolefins produced with single-site metallocene catalyst technology such as Dow's Insite™ technology and Exxon's Exact® plastomers are surmised to be preferred shell material polymers, particularly for non-tacky pressure sensitive adhesive pellets and thermally activated shell adhesive applications, as will be described further in the forthcoming examples. The shell material comprises ingredients that do not detract from the adhesive properties.

For pressure activated adhesives, the shell will preferably release the core material at pressures ranging from about 0.5 psi to about 200 psi, more preferably from about 1 psi to about 70 psi. Polyurea melamine resin is a preferred shell material for pressure activated hot melt PSAs. For thermally activated shells, preferably the shell material melts at a temperature less than about 400° F., more preferably between about 175° F. and 325° F., as the majority of hot melt adhesives currently available have application temperatures in such a range.

As previously stated, for pressure activated hot melt PSAs, the microencapsulated ingredient is normally a liquid at ambient temperature. The hot melt adhesive is substantially non-tacky initially prior to release of the flowable core ingredient. Upon application of pressure, the shell material is ruptured, causing release of the microencapsulated core ingredient which in turn mixes with and tackifies the surrounding ingredients. The pressure required to rupture the shells ranges from 1 psi, which can easily be broken by hand, to in excess of about 30 psi, which can be mechanically applied. The tackiness of the adhesive after rupturing of the shell is a function of both the concentration of microcapsules as well and the size of the microcapsules. Preferably, the encapsulated ingredient is present in amounts ranging from about 5 to about 50 percent by weight, more preferably from about 10 to about 40 percent by weight of the total adhesive composition. Higher concentrations of encapsulated ingredients are advantageous for higher viscosity hot melt adhesive applications. The normally liquid ingredient is selected from the group consisting of liquid polymers such as Indopol™ (Amoco) polyisobutylene, liquid tackifiers such as Regalrez™ 1018 (Hercules) and Escorez™ 2520 (Exxon), liquid plasticizers such as paraffinic oils, naphthenic oils, phthalate and benzoate esters and mixtures thereof wherein the softening point is less than about 35° C.

The pressure activated hot melt adhesive significantly departs from traditional hot melt PSAs in that the ingredient imparting pressure sensitivity is temporarily isolated from the other ingredients. Generally, the terminology "hot melt adhesive" has been reserved for applications that are applied and form bonds with other materials while molten. The hot melt PSA of the present invention comprising at least one ingredient present in an encapsulated form may form bonds while molten and/or form bonds after being cooled to ambient temperature. The pressure activated hot melt adhesives of the invention have utility in a variety of applications, particularly for improved cohesive adhesive systems. Cohesive cold seal adhesive systems are those in which the adhesive is initially applied molten to a substrate such as an envelope or film. Once cooled, the adhesive is essentially non-tacky, yet adheres to itself upon contact. Cohesive cold seal adhesive systems have a variety of applications such as self-sealing envelopes, release paper-free labels and decals, "tabless" diaper tapes, for bonding porous substrates, as well as for adhesive sheets which are commonly used for rapid prototyping (paper modeling) and for creating an adhesive sheet bulletin board or adhesive "magnets" which can be affixed to a rigid substrate for the purpose of releasably attaching notes and memos. The cohesive cold seals of the present invention can be formulated to exclusively bond only to themselves or alternatively the resulting adhesives can be formulated to produce sufficient bonds with other substrates and material. This aspect is particularly advantageous for envelope seals which typically employ two adhesive applications which are then bonded to each other. By employing the cohesive cold seal of the present invention, the applicants surmise only a single adhesive application would be needed, as the adhesive would have sufficient bond strength to the envelope material.

Bonding porous substrates is particularly useful for nonwoven applications. In recent years, perforated and apertured polyolefin films have gained acceptance in the marketplace as a topsheet for nonwoven disposable products due to the improved fluid permeability and tactile qualities they provide. It has become increasingly difficult to assemble disposable products on high-speed machinery utilizing these apertured films due to permeation of the pressure sensitive adhesive through the apertures causing tackiness on the body-facing surface. This tackiness is not only an undesirable problem, but can accumulate on the machinery causing considerable down time and loss of productivity. To avoid these problems, the pressure activated hot melt adhesive can be mechanically pressure activated near the end of the assembly process or alternatively after another layer has been introduced which limits the exposure of the activated hot melt PSA to the machinery. Alternatively, the encapsulated ingredient may have a shell which releases the core ingredient upon exposure to ultrasound or radiation. An emitting device can then activate the adhesive near the end of the assembly process or after another layer has been introduced which limits the exposure of the activated PSA.

Hot melt adhesive compositions comprising a normally liquid microencapsulated core ingredient wherein the shells are activated by pressure are also particularly useful for novel friction-activated glue sticks. Presently, water-based adhesives provided in cartridges or containers are utilized for glue-sticks. The glue-stick of the present invention can be formed in the same manner as typical hot melt glue-sticks wherein after mixing the ingredients with any known hot melt manufacturing technique, the molten adhesive is poured into cylindrical shaped molds. After cooling, the glue-stick is substantially rigid, not needing a support container, and substantially non-tacky to the touch. Upon applying frictional forces to the glue-stick surface, such as rubbing the surface of the glue-stick against a piece of paper, the microencapsulated liquid ingredient is released from the shells, activating the glue-stick, causing a deposition of pressure sensitive adhesive to remain on the paper. The composition of the glue-stick ranges from being "removable" to being of sufficient adhesive and cohesive strength to permanently bond paper based substrates. The "removable" friction activated glue-stick is particularly useful for allowing individuals to produce temporary, self-adhering notes by abrasion with paper. A variety of glue-stick shapes are also possible since the hot melt adhesive will retain the shape of the mold it was cast from. This aspect may be particularly attractive for glue-sticks intended for use by children. Crayon sized glue-sticks are envisioned to be most preferred.

Alternatively, the glue stick formed from molten thermoplastic ingredients may be sufficiently pliable and/or tacky such that an auxiliary container would still be desirable to facilitate handling. For this aspect the container may be any of the existing glue stick containers on the market as well as pencil and pen barrels. It may also be desirable to microencapsulate fragrances in the friction activated glue sticks as consumers, particularly children, are often attracted to this feature.

Preferable polymers for pressure activated hot melt adhesives include radial, linear and grafted block copolymers such as styrene-isoprene-styrene (SIS), styrene-butadiene-styrene (SBS), and styrene-ethylene/butylene-styrene (SEBS); amorphous polyolefins, particularly linear and substantially linear polyolefins produced with single-site metallocene catalyst technology such as Dow's Insite™ technology and Exxon's Exact® plastomers; ethylene-vinyl acetate (EVA), ethylene-methyl acrylate (EMA), and mixtures thereof. Recycled polyethylene terephthalate (PET) is believed to be particularly useful for the friction activated glue-sticks when combined with microcapsules of oil, diethyl phthalate, dioctyl phthalate and mixtures thereof. For the supported glue-sticks, combinations of tackifying resin and encapsulated liquid plasticizer in the absence of a thermoplastic polymer are also contemplated.

Pressure activated hot melt adhesives preferably further comprise at least one solid tackifying resin. Light colored resins such as Wingtack 95 ™, a C5 hydrocarbon resin, and Escorez™ 5000 series dicyclopentadiene based resins are particularly preferred for the friction glue-stick.

Up to 20.0% of wax is also useful to increase the rigidity and heat resistance particularly for the glue-stick. Most preferably, the wax concentration ranges from 0 to about 5.0% by weight.

In another aspect it may be desirable to produce water soluble friction activated glue-sticks. For this aspect, water soluble or water dispersible thermoplastic ingredients are particularly useful such as polyvinylpyrrolidone-co-vinyl acetate, polyethylene oxozylene, polyvinylalcohol, polyethylene oxide as well as others.

In another aspect inorganic salts such as calcium chloride may be added to the glue-sticks to create a heat generating friction glue-stick that is activatable with water. The concentration of inorganic salt ranges from about 5 wt % to about 30 wt % to produce the desired result. The inorganic salt may be encapsulated in a water soluble shell such as starch or alternatively may be dispersed in the glue-stick without being encapsulated.

Pressure Activated Hot Melt Adhesive Compositions

|  | Useful | Preferred | Most Preferred |
|---|---|---|---|
| Thermoplastic Polymer | 5–90 wt-% | 10–80 wt-% | 10–60 wt-% |
| Encapsulated Liquid | 5–80 | 10–50 | 10–40 |
| Solid Tackifying Resin | 0–65 | 10–60 | 30–60 |
| Wax | 0–20 | 0–10 | 0–5 |

Thermally activated shells are useful for other purposes, particularly for the addition of colorants such as dyes and pigments, antioxidants, fragrances, etc. These additives are typically found in hot melt adhesives at concentrations by weight of less than 5.0%, more preferably from about 0.10% to about 2.0%. For this application, a shell material is selected that has a melting point below the application temperature of the hot melt adhesive. During manufacturing, the unencapsulated hot melt adhesive ingredients are initially combined to form a molten mixture. The molten mixture is then cooled below the melt point of the shell material and the encapsulated ingredient added. The encapsulated ingredient is preserved in the hot melt adhesive until the adhesive is melted at a later time by the end user at which point the shell material becomes molten, releasing the encapsulated ingredient. Seeded shells are particularly useful for slow release of an ingredient. For this aspect, only small portions of the shell would become molten, whereas the majority of the shell would remain intact, maintaining the integrity of the microcapsule. The core material then slowly releases from the cavities formed at the melted regions. The rate of release is a function of the number and size of meltable regions which in turn creates the cavities upon melting.

Hot melt adhesives comprising an additive in a thermally activated shell is particularly advantageous for the addition of volatile components such as fragrances, to insure a specific concentration is present in the final adhesive composition upon reaching the end user. This aspect is also particularly advantageous as a clean and efficient means to add colorants not only to hot melt adhesive compositions but potentially any thermoplastic composition, particularly film grade neat polymers such as poly(ethylene-co-vinyl acetate), polyethylene, and polypropylene.

Another preferred use of thermally activated shells is in PSA capsules or pellets having a non-tacky surface. The hot melt adhesive ingredients which are substantially non-tacky at ambient temperature are first combined with one another using conventional hot melt mixing techniques. The mixture is then cooled to a temperature below the melt point of the shell material of the encapsulated, normally liquid ingredient. The encapsulated, normally liquid ingredient is then added to the mixture and pelletized. Since the normally liquid ingredient is isolated from the other ingredients until melted, the pellets remain non-tacky until melted by the end user. Alternatively, a hot melt adhesive capsule may be formed. In this instance, the polymer or a blend of polymers and other ingredients form the shell material, whereas the remaining ingredients are blended to form the core material. The core is then encapsulated by any known suitable microencapsulation technique to form hot melt adhesive capsules. For this aspect, the shell material preferably comprises polymer or a mixture comprising polymer, tackifying resin, and/or wax. For hot melt pressure sensitive adhesives that can easily be fed through an extruder prior to application, the shell material release mechanism may be pressure rather than temperature. Shell materials activated by pressure are also surmised to be suitable for extruder grades additives such as antioxidants and colorants, as mentioned previously.

Diffusion activated shells are those in which the core ingredient may leach through the shell material at ambient conditions. This activation mechanism provides yet another alternative method of adding colorants. For a hot melt PSA, a core material such as a dye can be encapsulated in a shell material, comprising a polymer and/or tackifying resin that would eventually dissolve in the adhesive.

Diffusion as well as pH provide appropriate release mechanisms for wetness indicators. For this aspect, a pH or water sensitive shell material would encapsulate a colorant or dye. When such encapsulated colorant is combined with an adhesive, the resulting adhesive composition produces a color change upon being exposed to liquid. This application finds particular utility in the adult incontinence market. Hot melt adhesive compositions for wetness indicators are known from U.S. Pat. Nos. 5,035,691 and 089,548 incorporated herein by reference.

TEST METHODS

Cohesive Adhesives—Self Seal Measurements

Test C1:

Measurement of Minimal Pressure to Self Seal

Test samples are prepared by coating the hot melt adhesive molten (350° F.) onto 2 mil polyester film using a slot die coater at a coat thickness ranging from about 4 to 10 mils (1 mil=0.001 inch). Two pieces of coated film are placed in contact with each other coated side to coated side. The observation is made whether or not the adhesive coatings adhere or not. Adhesion occurs when lifting one sheet causes the other sheet to also be lifted. The two sheets are then manually peeled, and the failure mode, "interfacial" or "cohesive" is noted. "Interfacial" failure refers to adhesive-to-adhesive failure at the adhesive interface wherein the coated films may be separated cleanly into the two original coated films. "Cohesive" failure refers to having a continuous adhesive layer formed upon sealing in which peeling results in destruction of the bond.

Test C2:

Finger Pressure

In the event that samples do not seal with minimal pressure (Test C1), the same test is repeated with finger pressure applied over the film. The same observations are recorded as described in Test C1.

Test C3:

Adhesion to Polyester with Minimal Pressure

A sample coated onto polyester film, as described in Test C1, is placed in contact with uncoated polyester film. The same observations as described in Test C1 are made.

Test C4:

Adhesion to Polyester with Finger Pressure

Test C3 is run under the conditions of Test C2.

Test C5:

Loop tack on Stainless Steel

Samples coated onto polyester film, as described in Test C1, are cut into 1" by 5" sections and tested with a Chem Instruments LT-100 Loop Tack Tester in accordance with the TLMI Loop Tack Test. The force of delamination is recorded.

Test C6:

Surface Tack

Surface tack is measured by touching the surface of the solidified adhesive with a finger. The adhesive is characterized as being "aggressive" meaning a significant level of resistance is experienced when removing one's finger, "removable" meaning a low level of resistance is experienced when removing one's finger, or "tack-free".

Test C7:

Mechanical Self—Seal Properties

For sheets which do not adhere with finger pressure and result in cohesive failure (Test C2), pressure is applied with a mechanical sealer. The time and pressure is recorded for which a bond is formed which when peeled, produces cohesive failure. Samples were prepared by coating polyester film with a slot die coater as mentioned in Test C 1. Two 12" by 1" strips are placed in a Sentinel™ heat sealer. (Contacting both adhesive coated sides of the film.) The jaw pressure and time for which the pressure was applied are noted. Testing was conducted at room temperature (78° C.).

Friction—Activated Adhesives

Test A1:

Surface tack is measured by touching the surface of the solidified adhesive by hand. The adhesive is characterized as being "tacky" or "tack-free".

Test A2:

Rigidity is measured by manually flexing a mass of solidified adhesive approximately ⅛" to ½" inch thick. The solidified adhesive is evaluated as either "soft"-meaning it is pliable, or "rigid"-meaning it will fracture.

Test A3:

Deposition is measured by rubbing a piece of the solidified adhesive over a piece of white legal notebook paper (UNV 20630 -St. Paul Book & Stationery). The paper is evaluated to determine whether a deposition is present-"yes" or lacking-"no". The tackiness of the deposition is also characterized as being "permanent" meaning a significant level of resistance is experienced when removing one's finger or "removable" meaning a low level of resistance is experienced.

Test A4:

Fiber Tear is measured by first depositing adhesive onto St. Paul Book & Stationery notebook paper according to Test A3, adhering 8" by 2" strips of St. Paul Book & Stationery notebook paper, and removing the strips within 5 minutes. Fiber tear was either observed-"yes" or not observed-"no".

Test A5:

Holding Power is measured by adhering strips of paper according to Test A4 and hanging the strips vertically, recording the time the adhesive bond fails at ambient temperature.

Discussion of Examples

Tables A and C depict adhesive compositions of the present invention comprising an encapsulated ingredient. Materials formulated with encapsulated mineral oil have significantly different tack properties prior to rupturing the shells than after the release of the encapsulated ingredient. Tables B and D depict the test data for the adhesive compositions. Tables A and B are directed toward friction activated glue-stick, whereas Tables C and D are directed toward cohesive cold seal adhesives. Several of the compositions can be found on both tables indicating the versatility of this technology. Accordingly, the presentation of the examples in this manner is not intended to be limiting, as the adhesive compositions themselves are useful for potentially any hot melt adhesive application.

Examples 1–18 of Tables A and B depict adhesive compositions directed toward use for glue-sticks having good holding power. Examples 1–3, 8–9 and 16–17 are amenable to adhesive "crayon" applications since the compositions are sufficiently rigid to the extent that a container is not needed and tack-free prior to rupturing the encapsulated oil. Examples 1–3 and 16–17 exhibit relatively aggressive adhesive properties in that the adhesive deposition formed upon applying pressure is sufficient to produce fiber tearing bonds with paper like materials. The adhesive composition of Examples 8–9 are directed toward temporary bonding since the glue deposition creates a removable, non-destructive bond. Examples 4–7 and 10–15 are demonstrative of glue-stick compositions preferably provided in a container. The adhesion varies from removable to permanent as in the previous rigid glue-stick examples. Examples 16 and 17 exemplify the use of recycled PET as a base polymer.

Examples 19–22 represent adhesive compositions of the present invention having the proper balance of adhesion for self seal sheet adhesive applications since these examples exhibit minimal adhesion to other substrates and have little to no surface tack in combination with excellent self-adhesion.

Example 19 (5580-6-1) and Comparative Example A (5580-54-3) of Table C are identical in composition with the exception that Comparative Example A comprises a typical hot melt PSA wherein the mineral oil is not encapsulated in a shell whereas in Example 19 the mineral oil is present in an encapsulated form. Comparative Example A has aggressive finger tack and produces 10.4 pounds of loop tack in contrast to Example 19 of the present invention having "0" loop tack and removable finger tack. The pressure required to activate or rupture the capsules, resulting in a cohesive layer being formed, depends on the formulation. Several samples, such as Examples 19–21 of Tables C and D require little pressure to self-seal, whereas Examples 22 and 24 of Tables C and D require a pressure in excess of that which can be applied by hand.

Comparison of Examples 23 and 24 demonstrate the ability to tailor the properties of the adhesives by varying the shell structure. ESI encapsulated mineral oil differs from 3M's slightly in that the ESI material would not seal in Example 24 (51 -1), yet Example 23 (6-2) demonstrates self-seal properties. The reason is surmised to be the difference in shell wall concentration and hence oil concentration, as shown below.

| Material | Capsule Diameter (um) | Core Volume (%) |
|---|---|---|
| 3M | 32 | 85 |
| ESI | 30 | 76.2 |

Both materials contain mineral oil encapsulated in a poly-urea melamine resin shell. The ESI material is surmised to be more difficult to rupture owing to its greater wall thickness. Heat can also cause activation. Example 26 shows no tack or adhesion to polyester film as prepared and tested under normal conditions. However, upon heating this sample above 200° C., the capsules rupture. Upon cooling, the material has aggressive tack. This shows the utility of capsules to temporarily reduce tack and the ability to generate tack by breaking capsules. This allows for the efficient production of compositions which are initially tack-free yet capable of forming pressure sensitive adhesives upon rupturing of the capsules by means of pressure and/or temperature.

TABLE A

Friction Activated Glue-stick Adhesive Composition

| Ex. # | Reference # | Polymer | wt-% | Tackifying Resin | wt-% | Encapsulated Ingredient | wt-% |
|---|---|---|---|---|---|---|---|
| 1 | 5114-44-1 | UE 654-67 | 13 | Zonatac 105L | 56.5 | (3M) 32 um encap oil | 30.5 |
| 2 | 5724-50-1 | UE 654-67 | 13 | Zonatac 105L | 56.5 | (ESI) 30 um encap oil | 30.5 |
| 3 | 5724-53-3 | UE 654-67 | 10 | Sylvatac 1103 | 60 | (ESI) 30 um encap oil | 30 |
| 4 | 5724-54-2 | Elvax 205 | 30 | Zonatac 105L | 50 | (ESI) 30 um encap oil | 20 |
| 5 | 5580-6-1 | Kraton D1117 | 20 | Zonatac 105L | 50 | (3M) 32 um encap oil | 30 |
| 6 | 5580-61-5 | Kraton D1117 | 20 | Escorez 5400 | 50 | (3M) 32 um encap oil | 30 |
| 7 | 5724-53-6 | Rextac RT 2715 | 70 | none | 0 | (ESI) 30 um encap oil | 30 |
| 8 | 5724-54-3 | Elvax 205 | 20 | Escorez 5600 | 40 | (ESI) 30 um encap oil | 40 |
| 9 | 5580-6-2 | Kraton G1657 | 20 | Zonatac 105L | 50 | (3M) 32 um encap oil | 30 |
| 10 | 5580-6-3 | Kraton D1117 | 20 | Escorez 1310LC | 50 | (3M) 32 um encap oil | 30 |
| 11* | 5580-61-3 | Kraton D1117 | 20 | Zonatac 105L | 45 | (3M) 32 um encap oil | 30 |
| 12 | 5724-51-1 | Kraton G1657 | 20 | Zonatac 105L | 50 | (ESI) 30 um encap oil | 30 |
| 13 | 5724-51-2 | Kraton D1117 | 20 | Escorez 5400 | 50 | (ESI) 30 um encap oil | 30 |
| 14 | 5724-54-1 | Elvax 205 | 20 | Sylvatac 1103 | 40 | (ESI) 30 um encap oil | 40 |
| 15 | 5724-57-3 | Kraton D1117 | 30 | Sylvatac 1103 | 50 | (ESI) 30 um encap oil | 20 |
| 16 | 5709-7-1 | EVCO BC-Bind | 80 | none | | diethyl phthalate | 20 |
| 17 | 5709-7-2 | EVCO BC-Bind | 75 | none | | diethyl phthalate | 25 |
| 18 | 5724-57-1 | Engage 8400 | 15 | Escorez 5600 | 45 | (ESI) 30 um encap oil | 40 |

*Example 11 also comprises 5.0% of wax (Okerin 236TP)

TABLE B

Friction Activated Glue-stick Adhesive Properties

| Ex. # | Reference # | Test A1 Surface Tack | Test A2 Rigidity | Test A3 Deposition | Test A4 Fiber tear | Test A5 Holding Power |
|---|---|---|---|---|---|---|
| 1 | 5114-44-1 | tack-free | rigid | yes, permanent | yes | hold > 1 wk |
| 2 | 5724-50-1 | tack-free | rigid | yes, permanent | yes | hold > 1 wk |
| 3 | 5724-53-3 | tack-free | rigid | yes, permanent | yes | hdld > 1 wk |
| 4 | 5724-54-2 | tack-free | soft | yes, permanent | yes | hold > 1 wk |
| 5 | 5580-6-1 | tack-free | soft | yes, permanent | yes | hold > 1 wk |
| 6 | 5580-61-5 | tack-free | soft | yes, permanent | yes | hold > 1 wk |
| 7 | 5724-53-6 | tacky | soft | yes, permanent | yes | hold > 1 wk |
| 8 | 5724-54-3 | tack-free | rigid | yes, removable | no | hold > 1 wk |
| 9 | 5580-6-2 | tack-free | rigid | yes, permanent | no | hold > 1 wk |
| 10 | 5580-6-3 | tack-free | soft | yes, removable | no | hold < 1 wk |
| 11 | 5580-61-3 | tack-free | soft | yes, permanent | no | hold > 1 wk |
| 12 | 5724-51-1 | tack-free | soft | yes, permanent | no | hold < 1 wk |
| 13 | 5724-51-2 | tacky | soft | yes, removable | no | hold < 1 wk |
| 14 | 5724-54-1 | tacky | soft | yes, removable | no | hold > 1 wk |
| 15 | 5724-57-3 | tacky | soft | yes, removable | no | hold < 1 wk |
| 16 | 5709-7-1 | tack-free | rigid | yes, permanent | yes | hold > 1 wk |
| 17 | 5709-7-2 | tack-free | rigid | yes, permanent | yes | hold > 1 wk |
| 18 | 5724-57-1 | tacky | rigid | yes, removable | no | hold > 1 wk |

TABLE C

Cohesion Cold Seal Adhesive Compositions

| Ex. # | Reference # | Polymer | wt-% | Tackifying Resin | wt-% | Encapsulated Ingredient | wt-% |
|---|---|---|---|---|---|---|---|
| 19 | 5580-6-1 | Kraton D1117 | 20 | Zonatac 105L | 50 | (3M) 32 um encap oil | 30 |
| 20 | 5580-6-3 | Kraton D1117 | 20 | Escorez 1310LC | 50 | (3M) 32 um encap oil | 30 |
| 21 | 5580-61-3 | Kraton D1117 | 20 | Zonatac 105L | 45 | (3M) 32 um encap oil | 30 |
| 22* | 5580-61-5 | Kraton D1117 | 20 | Escorez 5400 | 50 | (3M) 32 um encap oil | 30 |
| 23 | 5580-6-2 | Kraton G1657 | 20 | Zonatac 105L | 50 | (3M) 32 um encap oil | 30 |
| 24 | 5724-51-1 | Kraton G1657 | 20 | Zonatac 105L | 50 | (ESI) 30 um encap oil | 30 |
| 25 | 5724-51-2 | Kraton D1117 | 20 | Escorez 5400 | 50 | (ESI) 30 um encap oil | 30 |
| 26 | 5580-21-1 | Engage 8400 | 25 | Escorez 1310LC | 45 | (3M) 32 um encap oil | 30 |
|  | 5580-54-3 | Kraton D1117 | 20 | Zonatac 105L | 50 | Kaydol Mineral Oil | 30 |

*Example 22 also contains 5.0 of wax (Okerin 236TP)

TABLE D

Cohesion Cold Seal Adhesive Properties

| Ex. # | Test C1 | Test C2 | Test C3 | Test C4 | Test C5 lbs | Test C6 | Test C7 psi (time) |
|---|---|---|---|---|---|---|---|
| 18 | adhere, cohesive | adhere, cohesive | adhere, interfacial | adhere, interfacial | 0 | removable | NA |
| 19 | adhere, cohesive | adhere, cohesive | adhere, interfacial | adhere, interfacial | 0.11 | removable | NA |
| 20 | adhere, cohesive | adhere, cohesive | adhere, interfacial | adhere, interfacial | 0 | removable | NA |
| 21 | adhere, cohesive | adhere, cohesive | adhere, interfacial | adhere, interfacial | 0 | removable | NA |
| 22 | no adhesion | adhesion, interfacial | no adhesion | adhere, interfacial | 0 | tack-free | 20 (1 sec) |
| 23 | no adhesion | adhesion, interfacial | no adhesion | adhesion, interfacial | 0 | tack-free | no seal @ 70 psi (5 sec) |
| 24 | adhesion, interfacial | adhesion, interfacial | no adhesion | no adhesion | 0 | removable | 30 (1 sec) |
| 25 | no adhesion | no adhesion | no adhesion | no adhesion | 0 | tack-free | no seal @ 70 psi |
| A | adhere, cohesive | adhere, cohesive | adhere, interfacial | adhere, interfacial | 10.4 | aggressive | NA |

Ingredient List

| | Description | Supplier |
|---|---|---|
| UE 654-67 | 33% VA/44 MI ethylene-vinyl acetate | Quantum |
| Elvax 205 | 28% VA/800 MI ethylene-vinyl acetate | DuPont |
| Kraton D-1117 | (styrene-isoprene-styrene) block copolymer, 17 wt % styrene, 106 melt index, 40 wt % diblock | Shell |
| Rextac 2715 | amorphous polyalphaolefin | Rexene |
| Kraton G-1657 | (styrene-ethylene-butylene-styrene) block copolymer, 13 wt % styrene, 8 melt index, 35 wt % diblock | Shell |
| EVCO BC-Binds | polyester (isophthalic acid modified PET) | Evco/Seydel |
| Engage 8400 | 30 melt index .870 density metallocene polyolefin | Dow |
| Zonatac 105 | modified terpene | Arizona |
| Escorez 5400 | cyclic aliphatic - hydrogenated | Exxon |
| Escorez 5600 | cyclic aliphatic - hydrogenated | Exxon |
| Sylvatac 1103 | rosin ester | Arizona |
| Okerin 236 TP | 155° F. Paraffin Wax | Astor Wax |

What is claimed is:

1. A method of making a hot melt adhesive composition comprising the steps of:
    a) combining unencapsulated hot melt adhesive ingredients to form a molten mixture;
    b) providing at least one ingredient encapsulated in a shell, wherein at least a portion of said shell material becoming molten at a temperature ranging from about 175° F. to about 350° F.;
    c) combining said molten composition with said encapsulated ingredient at a temperature lower than the melt point of said shell.

2. The method of claim 1 wherein the encapsulated ingredient is an additive selected from the group consisting of antioxidants, fragrances, pigments, dyes, fire retardants, and mixtures thereof.

3. The method of claim 1 wherein the shell material further comprises non-meltable portions.

4. The method of claim 1 wherein said encapsulated ingredient is subsequently released by means of melting said shell.

5. The method of claim 1 wherein said encapsulated ingredient is a liquid.

6. The method of claim 5 further comprising the step of pelletizing said composition.

7. The method of claim 6 wherein the encapsulated ingredient is subsequently released by means of pressure.

8. A method of making a pressure sensitive hot melt adhesive composition comprising the steps of:
    a) combining hot melt adhesive ingredients which are substantially non-tacky to form a mixture;
    b) providing at least one liquid ingredient encapsulated in a shell;
    c) adding the encapsulated ingredient to said mixture.

9. The method of claim 8 wherein the thermoplastic polymer is selected from the group consisting of block copolymers, amorphous polyolefins, metallocene polyolefins, ethylene-vinyl acetate, ethylene-methyl acrylate, polyethylene terephthalate, and mixtures thereof.

10. The method of claim 8 wherein the encapsulated ingredient is a plasticizing oil.

11. The method of claim 8 further comprising the step of forming said composition into a pellet.

12. The method of claim 8 wherein said composition is substantially non-tacky prior to the release of the encapsulated ingredient.

13. A method of using a pressure sensitive hot melt adhesive comprising the steps of:
    a) providing a hot melt adhesive composition produced from the method of claim 8;
    b) applying said composition to a substrate;
    c) releasing said liquid ingredient from said shell.

14. The method of claim 13 wherein said substrate is selected from the group consisting of an envelopes, labels, decals, diaper tapes, porous substrates, film and paper.

15. The method of claim 13 wherein the liquid ingredient is release upon application of pressure.

16. A method of using a glue-crayon comprising the steps of:
    a) providing an adhesive composition comprising at least one thermoplastic polymer and at least one liquid ingredient encapsulated in a shell;
    b) applying a force to said glue-stick such that said encapsulated ingredient is released from said shell;
    c) depositing said adhesive composition onto a substrate.

17. The method of claim 16 wherein the thermoplastic polymer is selected from the group consisting of block copolymers, amorphous polyolefins, metallocene polyolefins, ethylene-vinyl acetate, ethylene-methyl acrylate, polyethylene terephthalate, and mixtures thereof.

18. The method of claim 16 wherein the encapsulated ingredient is a liquid at ambient temperature.

19. The method of claim 16 wherein the encapsulated ingredient is an oil.

20. The method of claim 16 wherein the adhesive composition further comprises a solid tackifying resin.

* * * * *